March 18, 1947.  E. H. TRAUB  2,417,621
COLOR IMAGE PROJECTION SYSTEM
Filed Oct. 5, 1945
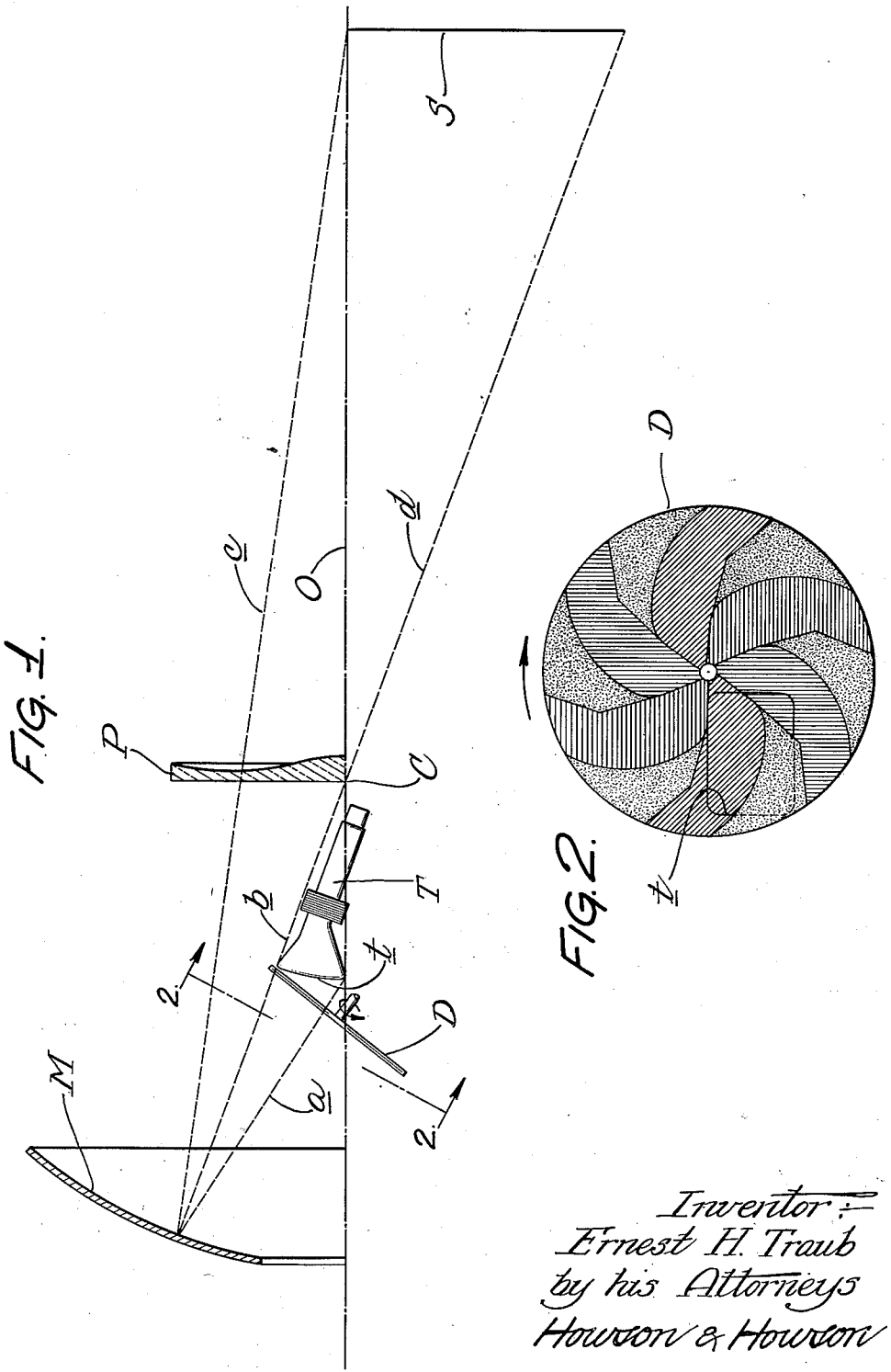
Inventor:
Ernest H. Traub
by his Attorneys
Howson & Howson Patented Mar. 18, 1947

2,417,621

UNITED STATES PATENT OFFICE 2,417,621

COLOR IMAGE PROJECTION SYSTEM

Ernest H. Traub, Philadelphia, Pa., assignor, by mesne assignments, to Philco Corporation, Philadelphia, Pa., a corporation of Pennsylvania Application October 5, 1945, Serial No. 620,547

8 Claims. (Cl. 178—5.4)

This invention relates to image-projection optical systems, and more particularly to such a system having provision for producing natural color effects by means of a rotating color-filter member, such as a disk or drum, arranged in the path of light projection.

In its broadest aspect, the invention is applicable generally to image-projection systems of the stated character. In its more limited aspect, the invention is primarily intended for use in such a system adapted to be employed in television receiving apparatus, and therefore the invention will be described with particular reference to such application.

Heretofore, the employment of a color-filter member, e. g. a color-filter disk, of reasonable size in an image-projection system especially adapted for use in a television receiver has involved difficulties in respect to light-obstruction or vignetting effects. In the so-called Schmidt system, for example, which has become increasingly popular and wherein the picture tube is disposed in front of a spherical concave mirror, the use of a rotating color-filter member has been virtually impossible due to such difficulties, especially since the picture tube itself tends to introduce some vignetting which in itself presents a problem in some instances, as set forth in my co-pending application Serial No. 599,927, filed June 16, 1945.

The principal object of the present invention is to provide an image-projection system wherein the aforesaid difficulties are overcome.

Another object of the invention is to provide a novel image-projection system which is generally similar to the Schmidt system, retaining the wide aperture characteristics and advantages of such system, but in which the elements of the system are modified and arranged so as to adapt the system for the production of natural color effects by utilizing a color filter member.

A further feature of the invention is the provision of a novel system of the stated character wherein a concave mirror is arranged in offset relation to an image-producing device, and a rotatable color-filter member is arranged so that it extends into the field of light projection between said device and said mirror but is substantially outside the field of useful light reflection from said mirror.

Still another object of the invention is to provide a novel image-projection system for a television receiver.

Other objects and features of the invention will be apparent from the following detailed description with reference to the accompanying drawing in which Fig. 1 is a plan view, partly in section, of a system constructed and arranged according to the present invention; and Fig. 2 is a view taken along line 2—2 of Fig. 1, showing the preferred position of the color-filter member in relation to the target area or the image-forming screen of the picture tube.

As indicated above, the present invention contemplates what may be said to be a modification of the Schmidt system, in order to adapt the system for the projection of a color image, employing a rotatable color-filter member. In the Schmidt system as applied to television, a picture tube is arranged in front of a spherical concave mirror so as to project light thereon, with the axis of said tube aligned with the mirror axis, and a correcting plate is disposed at the center of curvature of the mirror, the purpose of which is to correct for spherical aberration of the mirror. As previously stated, such system does not lend itself to the production of natural color effects by means of a rotating color-filter member. The present invention evolved from the concept that it is possible to utilize one-half of the Schmidt system as the basis for a system of the same general type in which the elements are so arranged that it is possible to employ a rotating color-filter member to produce the desired color effects.

Referring to Fig. 1 of the drawing, there is shown an image-projection system which is generally similar to the Schmidt system, and in which there may be assumed to be an imaginary optical axis represented by the dot-and-dash line O. A picture tube T may be arranged as illustrated, being preferably disposed at an angle to said axis. A concave mirror M, which is preferably spherical in form, is disposed in offset relation to the picture tube in a position to receive light projected from the target area or image-forming screen t of the tube, substantially as shown. An image-reproducing screen S is arranged in the image-receiving region so as to receive the light reflected by the mirror M. A correcting plate P is interposed between the mirror M and the screen S in the field of light reflection from the mirror. The plate P is located approximately at the center of curvature C of the mirror M and is shaped so as to correct or compensate for the spherical aberration of the mirror.

Preferably, the target area $t$ of the tube T is a spherical surface whose center of curvature substantially coincides with the center of curvature C of the spherical mirror M. The center of the picture, which is preferably rectangular in shape, may be said to define with said center of curvature an imaginary axis. The useful portion of the mirror M is disposed wholly on one side of this latter imaginary axis. In the illustration, two extreme light rays are shown at $a$ and $b$, and the corresponding reflected rays are shown at $c$ and $d$.

With the elements of the image-projection system arranged as described, a color-filter member, shown in form of a disk D, is rotatably mounted so as to extend adjacent the image-forming screen $t$ of the picture tube, within the field of light projection between the picture tube and the mirror M. It will be noted that the arrangement of the elements enables the color-filter disk to be disposed substantially outside of the field of useful light reflection. It will be understood of course, that the disk D may be driven by any suitable means.

The disk D may be of any suitable form and may comprise sectors having different color-filtering properties, as will be well understood. Such disks are used as essential portions of certain color television systems, such, for example, as that described in the Proceedings of the I. R. E. for April 1942, at pages 162 to 182. The disk D is preferably located in relation to the screen $t$ of tube T as shown in Fig. 2, and the disk is rotated in the direction indicated by the arrow. It will be noted that the center of the disk is substantially aligned horizontally with the upper edge of screen $t$. The cross-hatched portions of the disk are the color-filter sections, while the stippled portions are opaque. The screen $t$ is preferably of rectangular form, and the color sections of the disk are designed accordingly, as described in the above-mentioned publication. Since the optical system inverts the image, the primary image on the picture tube screen is inverted, and the vertical scanning is effected upward or from bottom to top of the primary image. The arrangement of the disk and its direction of rotation are such that each color section of the disk moves upward across the picture frame as the cathode ray spot goes through its frame-scanning motion.

It will be noted further that the disk is arranged obliquely with respect to the axis O. Such disposition of the disk makes possible the filtering of all useful light in the projection field between the tube T and the mirror M without appreciable interception of the reflected light from the mirror. It also enables the use of a smaller disk than would be required if the disk were at right angles to the axis O.

In the usual Schmidt system, if a color filter disk is employed, a substantial portion of the disk is in the field of light reflection from the spherical mirror, and this causes degrading of the image unless special precautions are taken to mask the offending portions of the disk. Color filters of the type which it is feasible to employ do not have sharp cut off characteristics. Thus, for example, green light may be transmitted to at least some extent through a blue section of the filter, causing degradation of the image, unless masking is employed. The present system overcomes this disadvantage because there is virtually no light reflection through the color filter disk onto the screen S.

While the color-filter member has been shown in the form of a disk, it may take any other form which is suitable for use with the system shown. In other words, the present invention is not especially concerned with the form of the color-filter member employed, and is not limited to the particular form shown.

It will be seen from the foregoing description that the system provided by the present invention enables the use of a color-filter member without causing appreciable light obstruction or vignetting, and without causing degradation of the image. In constructing a system according to this invention, the mirror M and the correcting plate P should be of sufficient size to provide an aperture large enough for efficient projection of the image from the tube screen $t$ to the image-reproducing screen S. Moreover, the tube T should be so located in relation to the other elements that it will not interfere to any substantial extent with the transmission of light between the mirror M and the screen S.

While a single embodiment of the invention has been illustrated and described for the purpose of disclosure, it will be apparent that the invention is not limited thereto but is capable of various modifications within the scope of the appended claims.

I claim:

1. In an image projection system, an image-producing device, a concave mirror disposed in offset relation to the image in a position to receive light from said device, an image-reproducing screen arranged to receive light reflected by said mirror, and a color filter member disposed in the field of light projection between said device and said mirror but substantially outside the field of light reflection between said mirror and said screen.

2. In an image projection system, an image-producing device, a spherical concave mirror disposed in offset relation to the image in a position to receive light from said device, an image-reproducing screen arranged to receive light reflected by said mirror, a correcting plate in the field of light reflection between said mirror and said screen, and a color filter member rotatably mounted so as to be disposed in the field of light projection between said device and said mirror but substantially outside the field of light reflection between said mirror and said screen.

3. In a picture projection system for a television receiver, a picture tube, a concave mirror disposed in offset relation to said tube in a position to receive light from said tube, an image-reproducing screen arranged to receive light reflected by said mirror, and a color filter member rotatably mounted so as to be disposed in the field of light projection between said tube and said mirror but substantially outside the field of light reflection between said mirror and said screen.

4. In a picture projection system for a television receiver, a picture tube, a spherical concave mirror disposed in offset relation to said tube in a position to receive light from said tube, an image-reproducing screen arranged to receive light reflected by said mirror, a correcting plate in the field of light reflection between said mirror and said screen, and a color filter member rotatably mounted so as to be disposed in the field of light projection between said tube and said mirror but substantially outside the field of light reflection between said mirror and said screen.

5. In an image projection system, a spherical surface upon which a picture is formed for projection, the center of curvature of said surface and the center of said picture defining an axis, a spherical mirror having the same center of curvature as said spherical surface, the useful portion of said mirror being located wholly on one side of said axis in a position to receive light from said spherical surface, an image-receiving region, and color filter means disposed in the field of light projection between said surface and said mirror.

6. In an image projection system for a television receiver, a picture tube having a spherical surface upon which a picture is formed for projection, the center of curvature of said surface and the center of said picture defining an axis, a spherical mirror having the same center of curvature as said spherical surface, the useful portion of said mirror being located wholly on one side of said axis in a position to receive light from said spherical surface, an image-receiving region, and color filter means disposed in the field of light projection between said surface and said mirror.

7. In an image projection system, an image-producing device, a concave mirror disposed in offset relation to the image in a position to receive light from said device, an image-reproducing screen arranged to receive light reflected by said mirror, and a color filter disk rotatably mounted in the field of light projection between said device and said mirror, said disk being disposed obliquely so as to be substantially outside the field of light reflection between said mirror and said screen.

8. In a picture projection system for a television receiver, a picture tube, a concave mirror disposed in offset relation to said tube in a position to receive light from said tube, an image-reproducing screen arranged to receive light reflected by said mirror, and a color filter disk rotatably mounted in the field of light projection between said tube and said mirror, said disk being disposed obliquely with respect to the general plane of the tube face so as to be substantially outside the field of light reflection between said mirror and said screen.

ERNEST H. TRAUB.